US009852107B2

(12) United States Patent
Underwood et al.

(10) Patent No.: US 9,852,107 B2
(45) Date of Patent: Dec. 26, 2017

(54) TECHNIQUES FOR SCALABLE ENDPOINT ADDRESSING FOR PARALLEL APPLICATIONS

(71) Applicant: Intel Corporation, Santa Clara, CA (US)

(72) Inventors: Keith Underwood, Powell, TN (US); Charles F. Giefer, Seattle, WA (US); David Addison, Issaquah, WA (US)

(73) Assignee: INTEL CORPORATION, Santa Clara, CA (US)

( * ) Notice: Subject to any disclaimer, the term of this patent is extended or adjusted under 35 U.S.C. 154(b) by 186 days.

(21) Appl. No.: 14/998,255

(22) Filed: Dec. 24, 2015

(65) Prior Publication Data
US 2017/0185563 A1 Jun. 29, 2017

(51) Int. Cl.
*G06F 15/173* (2006.01)
*G06F 9/48* (2006.01)
*G06F 3/06* (2006.01)

(52) U.S. Cl.
CPC ...... *G06F 15/17331* (2013.01); *G06F 3/0604* (2013.01); *G06F 3/067* (2013.01); *G06F 3/0659* (2013.01); *G06F 9/4881* (2013.01)

(58) Field of Classification Search
USPC ................. 709/212, 213, 203, 205
See application file for complete search history.

(56) References Cited

U.S. PATENT DOCUMENTS 6,055,617 A * 4/2000 Kingsbury ............. G06F 12/10
711/165
7,152,026 B1 * 12/2006 Merritt ................ G06F 11/2028
703/13
(Continued)

FOREIGN PATENT DOCUMENTS

WO 2011-011768 A1 1/2011

OTHER PUBLICATIONS

International Search Report and Written Opinion issued in PCT Application No. PCT/US2016/063782, dated Mar. 13, 2017, 17 pages.

*Primary Examiner* — Jude Jean Gilles
(74) *Attorney, Agent, or Firm* — Grossman, Tucker, Perreault & Pfleger, PLLC

(57) ABSTRACT

Techniques are disclosed for algorithmic mapping of logical process identifiers in order to provide highly-scalable endpoint addressing in multi-node systems capable of performing massively parallel applications. In particular, nodes initiating inter-process communication with a target process may use an initiator-side translation process that performs an algorithmic mapping to translate a logical process identifier (e.g., a rank/processing element) into a target physical node identifier and a target local process identifier. The initiating node may then use hardware fabric of a multi-node network to route the inter-process communication to an appropriate node. A node may receive an inter-process communication and may use a target-side translation process in hardware to translate the target virtual process identifier into a local process identifier for the node. The node may then execute an operation in accordance with the inter-process communication, such as a get or set against a memory associated with the node.

24 Claims, 11 Drawing Sheets

(56) References Cited

U.S. PATENT DOCUMENTS

| | | | |
|---|---|---|---|
| 2004/0162952 A1* | 8/2004 | Feind | G06F 12/109 |
| | | | 711/147 |
| 2005/0246708 A1 | 11/2005 | Turner et al. | |
| 2007/0033413 A1 | 2/2007 | Terrell et al. | |
| 2007/0283123 A1 | 12/2007 | Vick et al. | |
| 2008/0109573 A1 | 5/2008 | Leonard et al. | |
| 2009/0144742 A1* | 6/2009 | Subhraveti | G06F 11/203 |
| | | | 718/104 |
| 2010/0042675 A1* | 2/2010 | Fujii | G06F 9/505 |
| | | | 709/203 |
| 2015/0227383 A1* | 8/2015 | Yoon | G06F 9/45558 |
| | | | 718/1 |

* cited by examiner

TECHNIQUES FOR SCALABLE ENDPOINT ADDRESSING FOR PARALLEL APPLICATIONS

GOVERNMENT RIGHTS

This invention was made with U.S. Government support under contract number H98230-13-D-0124, awarded by the Department of Defense. The Government has certain rights in this invention.

FIELD

The present disclosure is generally directed to communication between nodes of a multi-node network, and more particularly, to techniques for scalable endpoint addressing in a multi-node network executing parallel applications.

BACKGROUND

The use of a large number of multi-core processors combined with centralization techniques continue to increase in popularity for applications that feature computationally intensive tasks. For example, systems implemented with a large number of compute nodes disposed in proximity to each other, and coupled via high-speed interconnects, are particularly well suited for applications such as quantum mechanics, weather forecasting, climate research, oil and gas exploration, and molecular modeling, just to name a few. These multi-node systems may provide processing capacity many orders of magnitude greater than that of a single computer. This gap grows exponentially each year. For example, some multi-node systems have processing capacity (generally rated by floating point operations per second (FLOP)), in the petaflops range.

This pursuit of increased performance has led to approaches including massively parallel systems featuring a large number of compute nodes, with each node providing one or more processors, memory, and an interface circuit connecting the node to a multi-node network. The processing capacity of a given multi-node network can scale based on adding additional nodes. However, as multi-node systems approach exascale, or a billion billion calculations per second, the complexity of addressing large numbers of nodes raises numerous non-trivial challenges.

Figure 1:
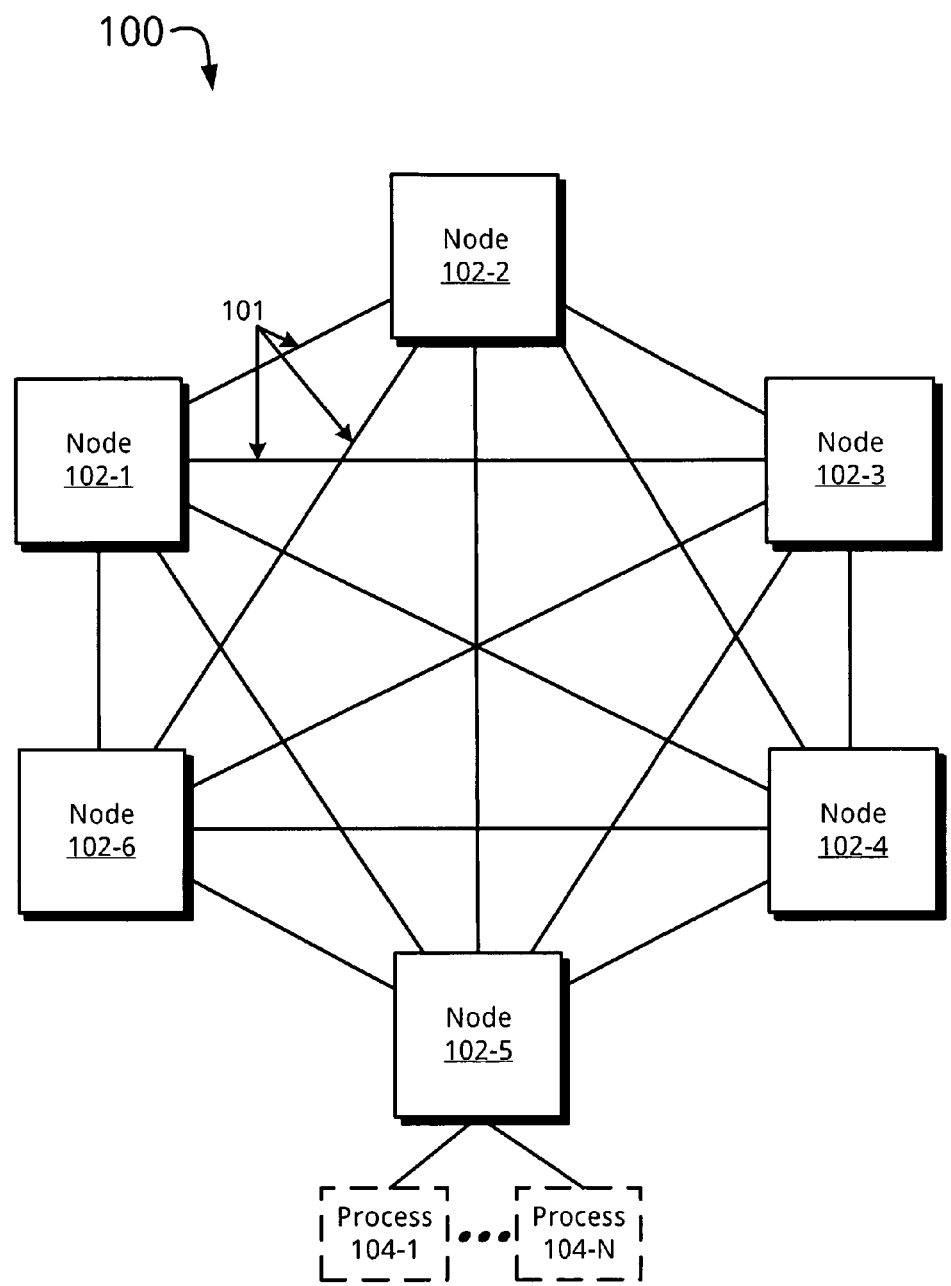
FIG. 1 is a block diagram of an example multi-node network having a plurality of interconnected nodes, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

High Performance Computing (HPC) Applications implemented using, for example, programming models such as the Message Passing Interface (MPI) and OpenSHMEM, generally utilize a large number of inter-connected nodes. The inter-connected nodes may form a so-called "fabric" whereby each node is communicatively coupled to every other node via a network. Each node may provide one or more processors, with each processor having N number of processing cores. During initialization, HPC applications may request a predefined number of nodes, and in particular, a number of processors or processor cores to carry out a process associated with a given parallel application, which may also be referred to as a job. During runtime of a parallel application, nodes may seek to communicate with one another, with this communication generally referred to as inter-process communication. HPC applications may view their allocated processes of the multi-node network as a contiguous range of logical identifiers (e.g., 0 . . . N−1). To this end, a logical identifier generally corresponds to a single process executed on a node. One or more cores of the node may execute each process, and may provide at least one hardware thread per process, although multiple processes may be scheduled on a same hardware thread. In the context of MPI, for example, these logical identifiers are generally referred to as ranks. Similarly, in the context of OpenSHMEM, these identifiers are generally referred to as processing elements (PEs).

However, the particular nodes allocated to a given parallel application may not necessarily manifest as a physically contiguous range of nodes from the point of view of the multi-node network. For example, a parallel application may have a non-contiguous range of physical nodes, e.g., physical nodes 1, 7, 8 and 9. To this end, approaches to inter-node communication in multi-node networks, and in particular those executing HPC applications, use a translation routine that converts a logical node identifier into a target physical node identifier which is addressable or otherwise routable by the network, and a target process identifier which may be used by the target physical node to execute an operation in accordance with the inter-process communication. For example, some example operations include memory operations such as gets/sets which seek to retrieve data (or a reference) from a memory associated with the target process or write data to the memory, respectively.

Some approaches to translation include a table lookup at the node initiating the inter-process communication. For example, nodes may include one or more rank translation tables, which may manifest as a so-called "full table." In full-table implementations, every rank/PE is represented and includes a corresponding physical node address. However, such tables are proportionally sized to the number of ranks/PEs present on the multi-node network, which may unfortunately limit scalability. This is because a translation table with, for example, 1 million ranks/PEs may use about 4 megabytes of space depending on a particular implementation, such as a network using a 16 bit local identifier (LID) and 16 bit process identifier (PID) to address each rank/PE. Interface circuits of nodes which may implement this table are thus required to have enough memory to accommodate the table lookup. In addition, accesses to "full tables" may consume significant time during lookups due to a "cache miss" as an access pattern into the table may randomly access large portions of the table.

Thus, in accordance with an embodiment of the present disclosure, techniques are disclosed for algorithmic mapping of logical process identifiers (e.g., ranks/PEs) in order to provide systems with highly-scalable node configurations. In particular, nodes initiating inter-process communication with a target process may use an initiator-side translation process that performs an algorithmic mapping to translate a logical process identifier (e.g., a rank/PE) into a target physical node identifier and a target virtual process identifier. The initiating node may then use hardware fabric of a multi-node network to route the inter-process communication to an appropriate node. A node may receive an inter-process communication and may use a target-side translation process to translate the target virtual process identifier into a local or physical process identifier for the node. The node may then execute an operation in accordance with the inter-process communication, such as a get or set against a memory area associated with the local process. The initiator-side translation process and the target-side translation process may be advantageously performed within hardware of the initiating node and target node, respectively, depending on a desired configuration.

In more detail, a node initiating inter-process communication with a target process may translate a logical process identifier into a target physical node identifier and a target virtual process identifier for the target physical node. In some cases, this includes hardware of the initiating node performing a calculation to derive a target physical node identifier and a virtual process identifier based on a decomposition of an allocated ranks/PE space, whereby the ranks/PE for a given parallel application may be mapped across N nodes allocated to a particular parallel application. This translation may be accurately referred to as initiator-side translation. The algorithmic mapping may include striped, blocked, folded, Hilbert space filling curves, or other computable algorithmic mappings depending on the implementation. Hardware of the node may then use the target physical node identifier in concert with fabric hardware of the multi-node network to route an inter-process communication including the calculated target virtual process identifier to the appropriate physical node.

On the other hand, a node receiving the inter-process communication may identify a particular local process associated with the inter-process communication by using a target-side translation process which translates the target virtual process identifier received with the inter-process communication into a local process identifier. In some cases, the target-side translation process includes using a table lookup, wherein all presently-allocated ranks/PEs of the node include a corresponding entry and are indexed by their associated virtual process identifier.

In other cases, the target-side translation process includes accessing a content addressable memory (CAM) device, with the CAM having a search key of a job, and a search result that includes a physical process base address. As should be appreciated, implementations of programming models such as MPI can provide meta-data with each packet including a job tag. So, the job tag may be utilized to determine a base physical process address using the CAM. In this embodiment, each job includes a contiguous range of process identifiers starting from the base address. Thus, the node may add the target virtual process identifier to the base address retrieved from the table to calculate a physical process address. In still other cases, the target-side translation process includes using a process relocation table in addition to accessing a CAM to determine a base process address, as discussed above. In these cases, the process address that results from summing the base process address with the target virtual process identifier received with the inter-process communication is used in combination with a relocation table. The relocation table may map a plurality of process identifiers (e.g., calculated using the base process address) to a corresponding physical process identifier. As should be appreciated, this allows a flexible, non-contiguous, range of process identifiers to map to a particular job/parallel application. This approach may be particularly well suited for a scenario that includes multiple parallel applications allocating and de-allocating resources, thus leaving non-contiguous ranges of processes available for subsequent use. As should be appreciated, a multi-node system may implement any one of the aforementioned translation schemes, and may provide an interface that allows a particular implementation to be selected based on user-input, for example.

Numerous advantages will be apparent in light of this disclosure over other approaches to end-point addressing in multi-node networks. For example, by avoiding a table-based scheme at an initiating node, a large number of processes (ranks/PEs) may be addressable without having a locally-stored table consuming memory and other node resources. This is accomplished, in part, by algorithmically calculating a target virtual process identifier and transporting the same via the multi-node network to an appropriate node. Consider, for instance, N is the size of the node space and P is the size of the process space per node. Various embodiments disclosed herein enable a state space no greater than N+P per node; rather than N*P used by other approaches on each node. As P increases based on nodes being configured to provide ever more processing cores/processes, for instance, this may result in at least two orders of magnitude in state savings. In a more general sense, the algorithmic mapping enables a light-weight, highly-efficient set of instructions to translate logical identifiers to associated physical/local identifiers without necessarily using a memory lookup. Thus aspects and embodiments herein may provide a scalable translation mechanism capable of addressing up to and beyond 8 million logical processes (e.g., ranks/PEs) using a relatively small initiator-side table (e.g., about 256 kilobytes) and target-side table (e.g., of about 256 bytes), and can offload translation onto fabric hardware interfaces to minimize or otherwise mitigate latencies normally associated with large multi-node systems.

While specific references are made to HPC applications, this disclosure is not intended to be limited in this regard. For example, nodes may comprise standard computer systems, such as server computers commercially available for non-HPC applications (e.g., data storage, email servers, domain controllers, etc.). Thus, the multi-node network may not necessarily comprise a so-called "super computer" configured with ultra-high performance computing nodes. In addition, both general-purpose data center applications and specific-purpose data center applications are within the scope of this disclosure. For example, general-purpose data centers generally include infrastructure that supports a single business with a broad variety of applications, or an information technology (IT) service provider servicing many customers. On the other hand, specific-purpose data centers generally include university and military research, scientific laboratories, financial institutions, and search engine providers, just to name a few. Specific-purpose data centers generally implement specific usage patterns and are particularly well suited for highly-scalable architecture that is tailored for a single or otherwise limited number of purposes. In any such cases, the techniques for endpoint addressing in multi-node networks disclosed herein are equally applicable to both general-purpose data centers and specific-purpose data centers.

Now referring to the figures, FIG. 1 shows a multi-node network 100 in accordance with an embodiment of the present disclosure. As shown, each of the nodes 102-1 to 102-6 are communicatively coupled to each other via paths 101 or links. The multi-node network 100 may also be accurately referred to as a fabric system having an all-to-all configuration whereby each node has a node path to all other nodes. As should be appreciated, the multi-node network 100 is illustrated in a highly simplified form. Likewise, other node topologies are within the scope of this disclosure and the example embodiment of FIG. 1 is not intended to limit the scope of this disclosure. The multi-node network 100 may include N number of nodes and is not necessarily limited to six nodes, as shown. For example, the multi-node network 100 may include thousands of nodes, or more (e.g., 1M+), depending on a desired configuration.

In an embodiment, each of the paths 101 may include associated networking switching equipment such as network switches, routers, and other high-speed interconnects. For example, the paths 101 may form a switched-fabric or switching-fabric network topology in which each node is communicatively coupled to the multi-node network 100 via one or more network switches. Alternatively, or in addition to switched-fabric, one or more paths may also physically manifest as a data bus, such as a PCI Express data bus or a proprietary data bus implemented by, for example, a backplane that couples two or more nodes. In one specific example not meant to limit the present disclosure, one or more of the paths 101 may comprise high-bandwidth interconnects such as 10 Gigabit InfiniBand interconnects. In any event, the multi-node network 100 may spread network traffic across multiple physical links represented by each of paths 101, which may yield throughput that exceeds that of other network approaches, such as broadcast networks implementing Ethernet.

Figure 9:
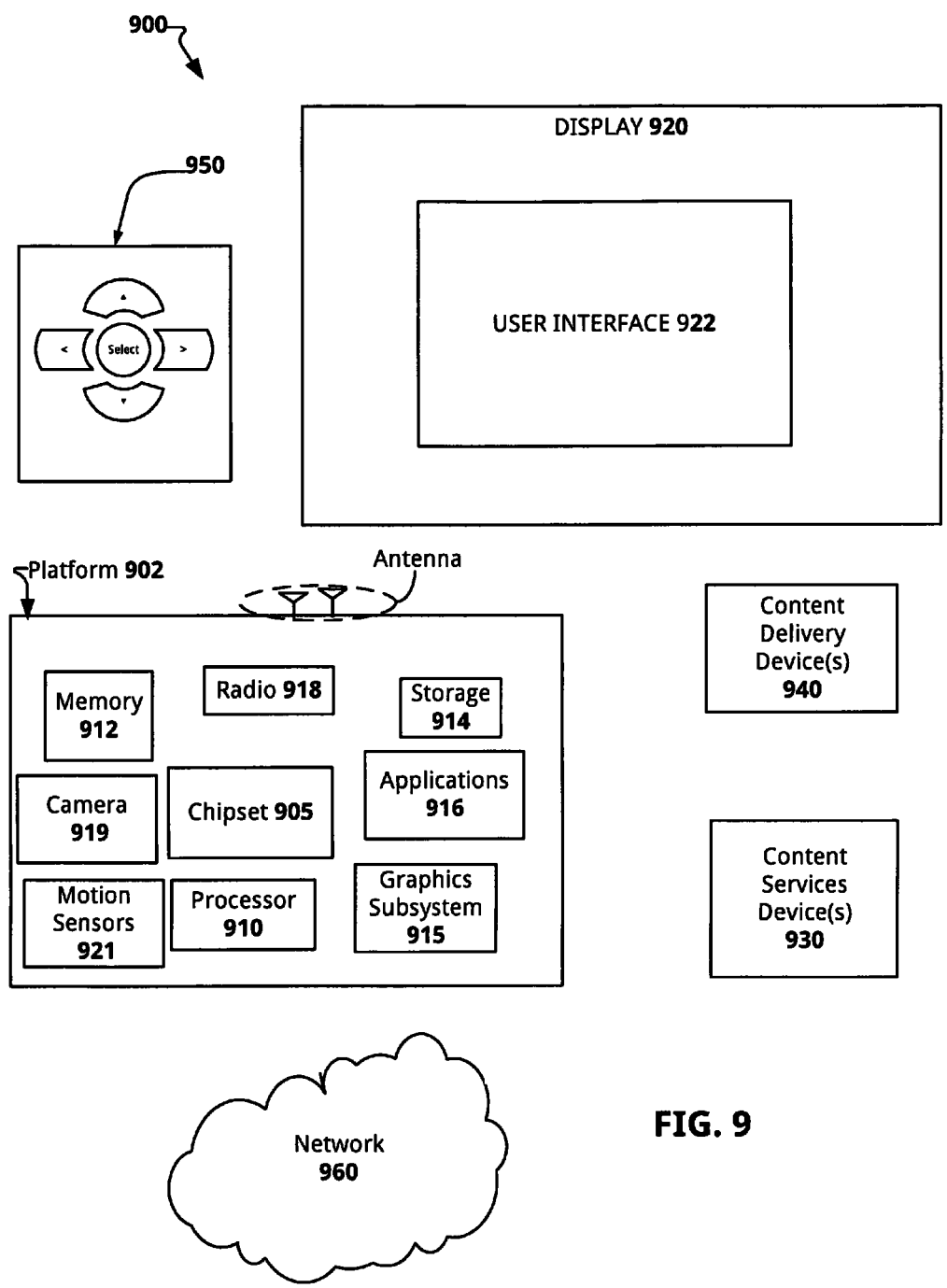
FIG. 9 illustrates a computer system configured to perform various processes disclosed herein, in accordance with an example embodiment of the present disclosure.

In an embodiment, each of the nodes 102-1 to 102-6 may comprise a computing system, such as the computing system 900 of FIG. 9. Each of the nodes 102-1 to 102-6 may comprise the same hardware and operating system, although different operating systems may be used on each node, and/or on different hardware. In some cases, one or more nodes may comprise a single-board or small form-factor (SFF) compute device enabling high-density applications. For example, datacenters may choose these types of compute nodes to maximize or otherwise increase the ratio of processors/cores per rack unit (U) of rack space.

Figure 2:
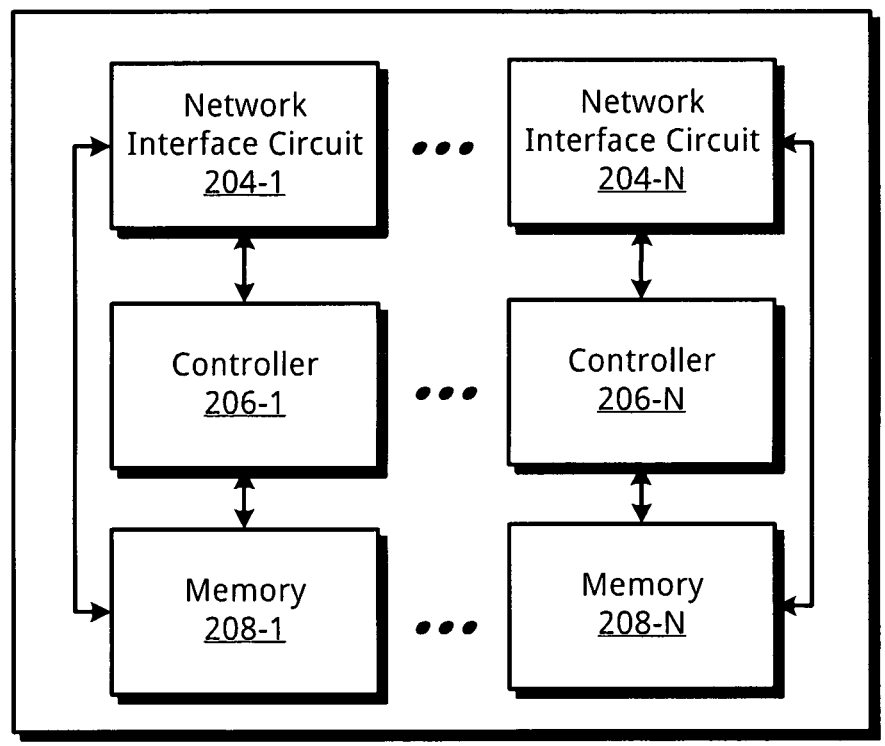
FIG. 2 is a block diagram of one example node of the multi-node network of FIG. 1, in accordance with an embodiment of the present disclosure.

Referring to FIG. 2, a block diagram illustrates an example node 102-X compatible for use as a node of the multi-node network 100 of FIG. 1, in accordance with an embodiment of the present disclosure. As shown, the example node 102-X comprises at least one network interface circuit 204-1 to 204-N, controller 206-1 to 206-N, and memory device 208-1 to 208-N. In an embodiment, the example node 102-X comprises a single system-on-chip (SoC) device, although other embodiments are within the scope of this disclosure. For example, each component of the example node 102-X may comprise a separate chip.

In more detail, each network interface circuit 204-1 to 204-N may be communicatively coupled to a respective one of controllers 206-1 to 206-N, and to a respective one of memory devices 208-1 to 208-N. The network interface circuits 204-1 to 204-N may each comprise hardware, software, or both, configured to transmit and receive signals using various communication techniques. For example, each network interface circuit 204-1 to 204-N may be configured to provide electrical signaling, optical signaling, or both, between nodes of the multi-node network 100. In any such cases, each network interface circuit 204-1 to 204-N may be configured to provide a plurality of bi-directional network ports with up/down speeds of at least 4.7 to 5.25 gigabytes (GB) per port, for example, although other link speeds are within the scope of this disclosure.

Each of the network interface circuits 204-1 to 204-N may include at least one processing device/circuit (not shown) such as, for example, a field-programmable gate array (FPGA), Reduced Instruction Set Computer (RISC) processor, x86 instruction set processor, microcontroller, an application-specific integrated circuit (ASIC). To this end, each of the network interface circuits 204-1 to 204-N may be configured to execute a plurality of instructions to carry out processes in accordance with various aspects and embodiments disclosed herein. For example, the processing device of the network interface circuit may be configured to execute the methods of FIGS. 4-8B. These processes may be may be implemented, for example, using software (e.g., C or C++ executing on the controller/processor), hardware (e.g., hard-coded gate level logic or purpose-built silicon) or firmware (e.g., embedded routines executing on a microcontroller), or any combination thereof.

As shown, each of the network interface circuits 204-1 to 204-N communicatively couples to a respective one of controllers 206-1 to 206-N and to a respective one of the memory devices 208-1 to 208-N. In an embodiment, this coupling may physically manifest as a high-speed serial data bus, such as a PCI-E serial bus, although numerous other communication techniques should be apparent in light of this disclosure. As discussed further below, each network interface circuit 204-1 to 204-N may be configured to perform direct memory access (DMA) on an associated memory device.

As should be appreciated, each of the network interface circuits 204-1 to 204-N may be optionally coupled directly or indirectly to each other for inter-node communication. For example, each of the network interface circuits 204-1 to 204-N may be directly coupled to each other such that intra-node messages are routed without utilizing fabric hardware (e.g., network switches, routers, and so on) of the multi-node network 100. On the other hand, each of the network interface circuits 204-1 to 204-N may be indirectly coupled to each other using a router device (not shown), which may intelligently direct intra-communications of the example node 102-X to an appropriate network interface circuit.

Each controller 206-1 to 206-N may include at least one processing device/circuit, but other embodiments are also within the scope of this disclosure. For example, each controller 206-1 to 206-N may comprise at least two processing devices. Some example processing devices include, for example, a Complex Instruction Set Computer (CISC), a field-programmable gate array (FPGA), Reduced Instruction Set Computer (RISC) processor, x86 instruction set processor, microcontroller, an application-specific integrated circuit (ASIC), a graphics processing unit (GPU), or central processing unit (CPU). In some cases, each processing device provides at least one processing core. For example, and in accordance with an embodiment, each processing device may comprise a multi-core processor configured to provide at least 16 processing cores. In some cases, each of the controllers 206-1 to 206-N is configured with the same hardware, although other embodiments are also within the scope of this disclosure. In any event, each of the controllers 206-1 to 206-N may include or otherwise receive instructions that when executed cause one or more processes to be carried out, such as processes comprising the methods of FIGS. 4-8B.

Each memory device 208-1 to 208-N may comprise, for example, a non-volatile storage device including flash memory and/or volatile storage devices such as Random Access Memory (RAM), Dynamic Random Access Memory (DRAM), and Static Ram (SRAM). In an embodiment, each memory device 208-1 to 208-N may comprise a content addressable memory (CAM) device. In this embodiment, the CAM device may comprise a semiconductor memory device (e.g., SRAM), and may include comparison circuitry (not shown) that enables a search operation to complete in a single clock cycle.

Returning to FIG. 1, the nodes 102-1 to 102-6 of the multi-node network 100 may be configured to execute distributed memory applications (or parallel applications) that comport with Message Passing Interface (MPI), Shared Memory Access (SHMEM), and Partitioned Global Address Space (PGAS) programming models, although other models are also within the scope of this disclosure. To this end, and in accordance with an embodiment, each of the nodes 102-1 and 102-5 may collectively execute one or more parallel applications in accordance with these programming models. In some cases, each processor device of nodes 102-1 to 102-6, and more particularly, each core provided thereby, may provide a process which is uniquely identifiable and addressable within the multi-node network 100. For example, and as shown, the node 102-5 may provide processes 104-1 to 104-N, with each process being executed by a dedicated processor core.

The multi-node network 100 may provide a dynamic allocation of computing resources such that a parallel application may be executed across M nodes and N processes/cores, with the particular number of nodes and processes being allocated based on the particular implementation of the parallel application. For example, a parallel application may request a particular number of desired processes to perform a desired set of computations. In response, the multi-node network 100 may assign a contiguous or non-contiguous range of nodes and associated processes to each parallel application. In some cases, the multi-node network 100 may simultaneously support a plurality of such parallel applications, with each of the executed parallel applications having a pool of privately allocated resources.

During runtime of a given parallel application, the multi-node network 100 may provide cache coherence such that shared resource data is consistent amongst of a plurality of memory devices which caches the same. In a general sense, cache coherence can provide a protective mechanism that prevents cache data being in an invalid state or otherwise in conflict when two or more nodes/processes are operating on a same piece of data. In one particular example embodiment, the multi-node network 100 at least partially implements cache coherence by each node only caching locally-generated data within its associated memory. To this end, remotely-generated data (e.g., data generated by a remote node) is acquired through performance of gets/sets. For example, a node initiating a "set" on a target process may cause a packet to propagate through the multi-node network 100 to a target node associated with the target process, and once received thereby, causes the target node to perform a write operation against a region of memory associated with the target process. On the other hand, a node initiating a "get" on a target process may cause the target node to read a region of memory associated with the target process and return a particular piece of data desired by the initiating node via the multi-node network 100.

Parallel applications operate generally in the logical space such that each process is aware of other processes associated with the same parallel application based on a contiguous range of identifiers, such as processes 0 . . . N−1. However, the particular pool of resources allocated to a given parallel application is not necessarily a contiguous range of node identifiers and processes. For example, consider the following example table:

TABLE 1

Example Allocated Resource Pool for a Parallel application

| Logical Process Identifier | Physical Node Identifier | Physical Process Identifier |
|---|---|---|
| 0 | 100 | 2 |
| 1 | 100 | 3 |
| 2 | 100 | 4 |
| 3 | 113 | 0 |
| 4 | 113 | 1 |
| 5 | 113 | 2 |
| 6 | 223 | 15 |
| 7 | 235 | 15 |
| 8 | 235 | 16 |
| 9 | 235 | 17 |

As shown above, each of the logical process identifiers corresponds to a non-contiguous range of physical node identifiers and associated physical process identifiers. Thus, and in accordance with an embodiment, inter-node operations may use a translation scheme wherein an initiating node converts a logical process identifier into an address that may be routed correctly via the multi-node network 100 to an intended recipient. In some cases, this address comprises a tuple, or other suitable address scheme, that identifies at least an intended target node and process.

Figure 3:
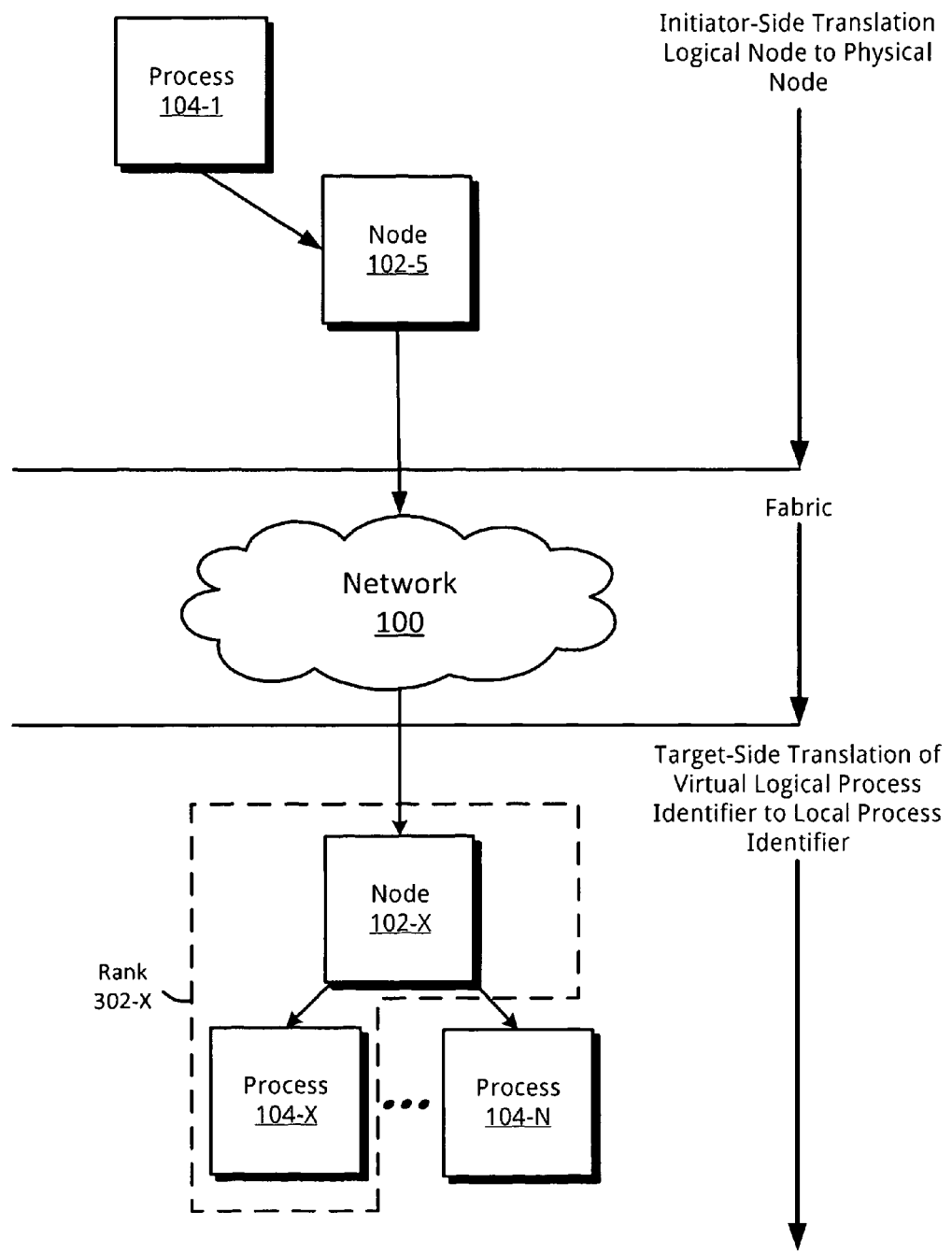
FIG. 3 illustrates an example process flow for initiating inter-process communications between nodes of the multi-node network of FIG. 1, in accordance with an embodiment of the present disclosure.

For example, FIG. 3 shows an example process flow for an inter-process operation between nodes 102-5 and 102-X. As shown, node 102-5 includes a process 104-1 which seeks to perform a remote operation against remote process 104-X. As discussed above, the process 104-1 may logically identify the process 104-X and associated node 102-X as a value within a contiguous range of logical process identifiers. Within the context of MPI, these logical identifiers may be referred to as "ranks." FIG. 3 illustrates one such example rank 302-X. Similarly, and within the context of OpenSH-MEM, these logical identifiers may be referred to as processing elements (PEs). For the purpose of clarity, FIG. 3 illustrates a target rank, but this should not be construed as limiting the present disclosure.

However, the fabric hardware (e.g., switches, routers, etc.) of the multi-node network utilize physical identifiers to route data to a correct node. Thus the node 102-5 may provide a desired operation (e.g., a get/set) and a logical process identifier to, for example, a network interface circuit or other hardware of the node 102-5 that may translate the logical process identifier into a routable address. The routable address may include at least a physical node identifier that may be used by fabric hardware of the multi-node network to route data to the target node, and a process identifier that allows the target node to perform the desired operation against the appropriate process.

Thus for the process 104-1 to initiate inter-process communication with target process 104-X, an initiator-side translation occurs to translate the logical process identifier, or in the context of FIG. 3 a target rank into a physical node identifier. One example initiator-side translation method 400 is discussed in greater detail below with reference to FIG. 4. Once translated, the hardware fabric of the multi-node network routes the inter-process communication to the correct physical node, which is node 102-X within the particular example context of the communication flow shown in FIG. 3. The inter-process communication may physically manifest as a packet (e.g., a plurality of bytes) or other suitable signal via the multi-node network. In turn, the node 102-X performs a target-side translation to translate a logical process identifier into a physical process identifier. Various target-side translation methods are discussed in greater detail below with reference to FIGS. 5-8B.

Example Methodology and Architecture

Figure 4:
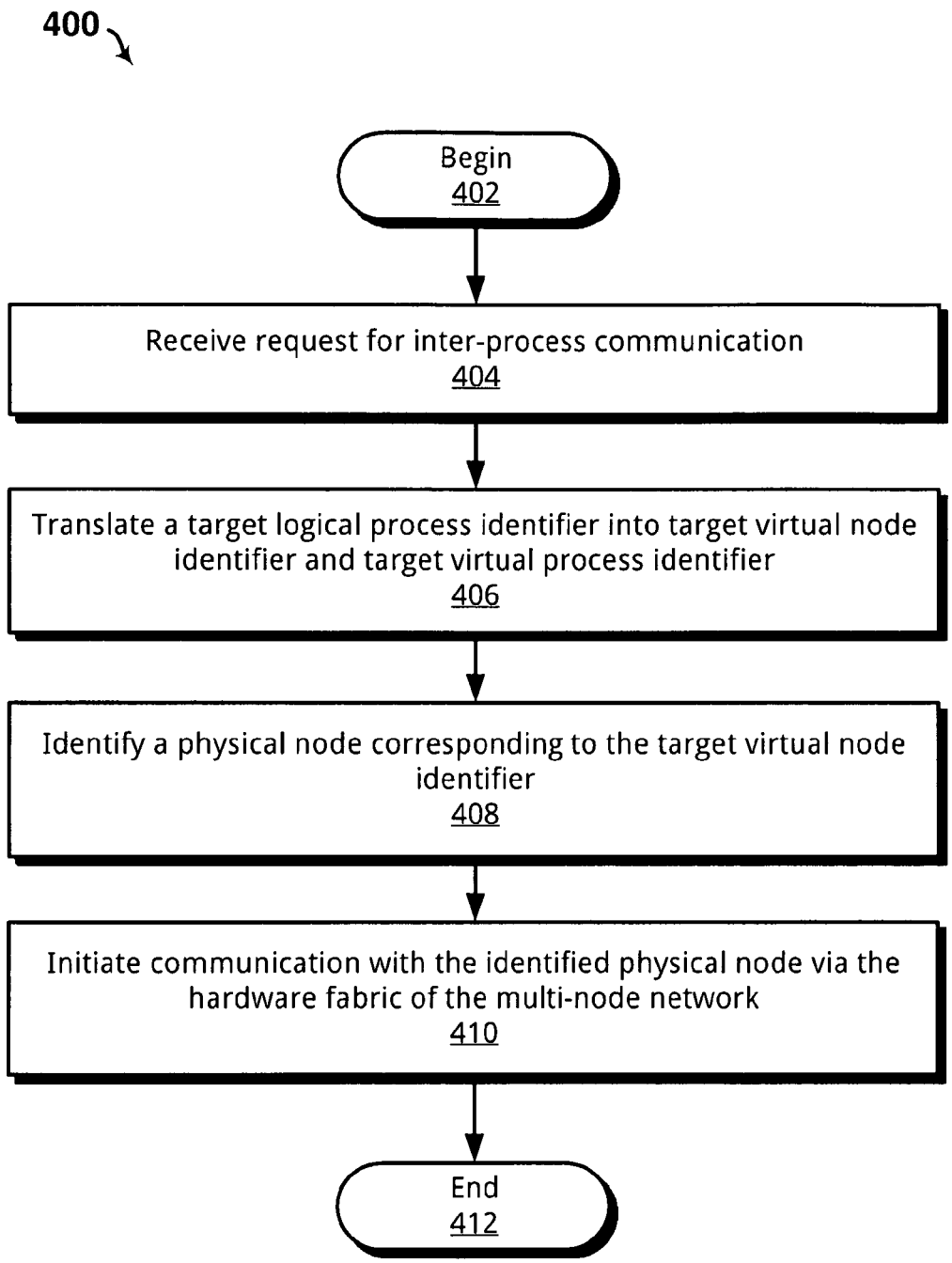
FIG. 4 shows an example method for initiating an inter-process communication in accordance with an embodiment of the present disclosure.

As previously discussed, various embodiments disclosed herein include methods for initiating inter-node communication between nodes of a multi-node network, such as the multi-node network 100. One such example method 400 is shown in FIG. 4. The example method 400 may be executed by a node such as the node 102-X of FIG. 2, and in particular, by the network interface circuit 204-1 to 204-N of the node. However, as should be appreciated the method 400 may also be performed, in part or in whole by the controller 206-1 to 206-N or other suitable controllers/circuits. The method 400 includes acts of receiving a request for inter-process communication, translating a target logical process identifier into a target virtual node identifier and a target virtual process identifier, identifying a physical node corresponding to the target virtual node identifier, and initiating communication with the physical node via the hardware fabric of the multi-node network. As should be appreciated, the acts of method 400 may not necessarily be executed in the order given, and moreover, some acts may be omitted, added or otherwise augmented depending on a desired implementation. Method 400 begins in act 402.

In act 404, the node receives a request for inter-process communication. In an embodiment, the request for inter-process communication may be via, for instance, an application programming interface (API) using MPI, OpenSH-MEM, or other suitable parallel application programming model. The request for inter-process communication may include, at least, a target logical process identifier. The target logical process identifier may be accurately referred to as target rank or target PE, depending on the particular programming model implemented by the node. In addition, and in an embodiment, the request for inter-process communication includes at least one operation to perform, such as a get or a set, and an optional data payload. The optional data payload may include, for example, a particular set of bytes to be written to a memory associated with a target process. Accordingly, the operation to perform may be accurately referred to as a memory operation within the context of MPI and OpenSHMEM, for example, as inter-process communication is directed to the manipulation of memory regions used by a particular process during runtime of a given parallel application.

In act 406, the node translates the target local process identifier into a target virtual node identifier and a target virtual process identifier. Act 406 may also generally be referred to as initiator-side translation process. In an embodiment, the initiator-side translation may include the node decomposing the rank space, e.g., the range of ranks allocated to a given parallel application, by algorithmically mapping the ranks across the physical nodes associated with those allocated ranks. In an embodiment, the algorithmic mappings may include, for example, striped, blocked, folded or Hilbert space filling curves. As should be appreciated, algorithmic mapping advantageously avoids indexing a lookup table that maps ranks to a physical node identifier.

For example, consider a parallel application having N number of allocated nodes with P processes per allocated node. In a block-based approach, the node portion of the target address may be calculated based on the following equation:

$$VirtualNode_T = \frac{\text{rank}}{P} \qquad \text{Equation (1)}$$

Wherein $VirtualNode_T$ is the target virtual node. The process portion of the target address may be calculated based on the following equation:

$$VirtualProcess_T = \text{rank} - P\left\lfloor \frac{\text{rank}}{P} \right\rfloor \qquad \text{Equation (2)}$$

Wherein $VirtualProcess_T$ is the target virtual process. Thus the node may determine a virtual target node identifier and a target virtual process identifier to direct the inter-node communication to.

In act 408, the node identifies a physical node corresponding to the target virtual node identifier determined in act 406. In an embodiment, the node identifies the physical node corresponding to the target virtual node identifier using a simple lookup table whereby each target virtual node includes a corresponding physical node identifier (e.g., Physical Node=Table[$VirtualNode_T$]). In other cases, a scalable node translation table may be utilized wherein the target virtual node is added to a base node value to derive a physical node identifier. This may allow a unique physical node mapping by adding a base node value to the target virtual node identifier. Thus multiple nodes may use common, contiguous, virtual node identifiers, e.g., starting at zero, to reference different physical nodes for the purpose of routing by the multi-node network 100. Table 2 illustrates one such example of physical node mapping for three different base node values: A, B and C.

TABLE 2

Physical Node Calculation

| Source Node | VirtualNode$_T$ | Physical Node |
|---|---|---|
| (Base Node = 100) | | |
| A | 0 | 100 |
| A | 1 | 101 |
| A | 2 | 102 |
| (Base Node = 200) | | |
| B | 3 | 200 |
| B | 4 | 201 |
| B | 5 | 202 |
| (Base Node = 300) | | |
| C | 6 | 300 |
| C | 7 | 301 |
| C | 8 | 302 |

In act 410, the node initiates communication with the physical node identified in act 408 via multi-node network 100, and more particularly, the hardware fabric of the multi-node network 100. In an embodiment, the multi-node network 100 selects a particular path through the multi-node network such that the inter-process request is properly routed to the particular node identified in act 408. In act 412 the method 400 ends.

Figure 5:
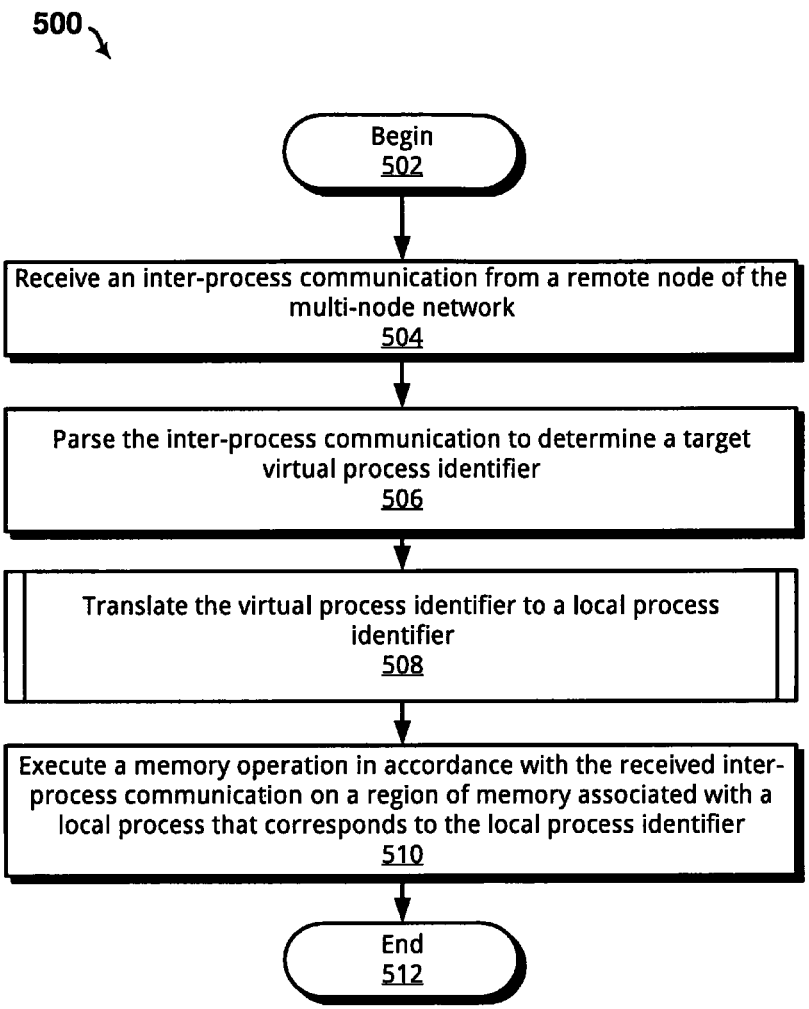
FIG. 5 shows an example method for receiving and servicing an inter-process communication, in accordance with an embodiment of the present disclosure.

Now referring to FIG. 5, one example method 500 for receiving an inter-process communication via the multi-node network 100 is shown in accordance with an embodiment of the present disclosure. The example method 500 may be executed by a node communicatively coupled to the multi-node network (e.g., node 102-X of FIG. 2), and more particularly, by hardware of the node. In an embodiment, the network interface circuit (e.g., network interface circuit 204-1) or other hardware may perform direct memory access (DMA) in order to satisfy a received inter-process communication, thus bypassing an associated controller. However, as should be appreciated the method 500 may be performed, in whole or in part, by other hardware and/or software of the node. For example, the controller 206-1 may perform all or some of the acts of method 500 depending on a given's nodes configuration. The method 500 includes acts of receiving an inter-process communication from a remote node of the multi-node network, parsing the inter-process communication to determine a target virtual process identifier, translating the virtual process identifier to a local process identifier, and executing a memory operation in accordance with the received inter-process communication on a region of memory associated with a local process that corresponds to the local process identifier. Method 500 begins in act 502.

In act 504, the node receives an inter-process communication from a remote node of the multi-node network 100. In act 506, the node parses the inter-process communication to determine a target virtual process identifier. In an embodiment, this may include the node inspecting one or more bytes of the received inter-process communication to identify the particular target virtual process identified therein. Once identified, and in act 508, the node translates the virtual process identifier to a local process identifier. Act 508 may also generally be referred to as target-side translation process. Some specific example methodologies for target-side translation are discussed further below with regard to FIGS. 6-8B.

In act 510, the node executes a memory operation in accordance with the received inter-process communication on a region of memory associated with a local process that corresponds to the local process identifier. For example, the memory operation may be a get or set directed to a particular memory area associated with the local process. The method 500 ends at act 512.

Figure 6:
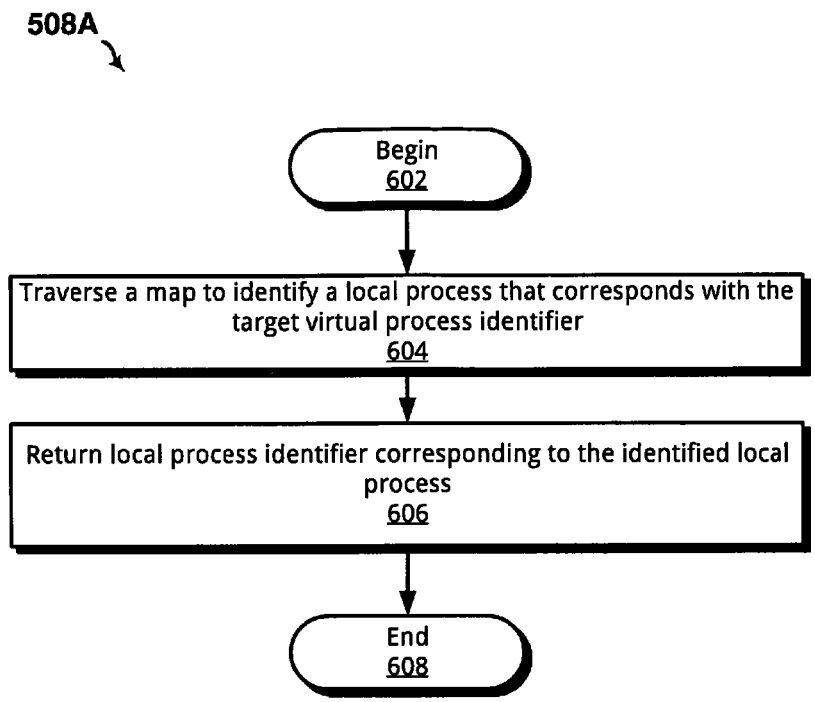
FIG. 6 shows an example process for performing target-side translation for use in the example method of FIG. 5, in accordance with an embodiment of the present disclosure.

Now referring to FIG. 6, an example target-side translation process 508A is shown in accordance with an embodiment of the present disclosure. The example target-side translation process 508A may be executed in hardware of the node, such as by the network interface circuit. However, other embodiments are also within the scope of this disclosure. For instance, the example target-side translation process 508A may be implemented in software or a combination of hardware and software. The example target-side translation process 508A includes acts of traversing a look-up table to identify a local process that corresponds with the target virtual process identifier, and returning a local process identifier corresponding to the identified local process. The example target-side translation process 508A begins in act 602.

In act 602, the node traverses a map to identify a local process that corresponds with the target virtual process identifier. In an embodiment, the map may comprise a look-up table or other suitable data structure in a memory associated with the node. The look-up table may include an index that allows efficient translation between a target virtual process identifier and an identifier of a local process. For example, Table 3 shows one example look-up table.

TABLE 3

Example Look-up Table

| Virtual Process Identifier | Local Process Identifier |
|---|---|
| 0 | 2 |
| 1 | 4 |
| 2 | 1 |
| 3 | 5 |
| 4 | 6 |
| 5 | 8 |
| 6 | 12 |
| 7 | 15 |
| 8 | 16 |
| 9 | 3 |

As should be appreciated, each of the processes of a node may be associated with multiple parallel applications. Thus the target-side translation method of FIG. 6 is particularly well suited for implementations that include a small number of parallel applications executed within each node.

In act 606, the node returns the calculated local process identifier. For example, the method 500 may use the identified local process in act 510 to execute a particular memory operation in accordance with a received inter-process communication. The method 508A ends in act 608.

Figure 7A:
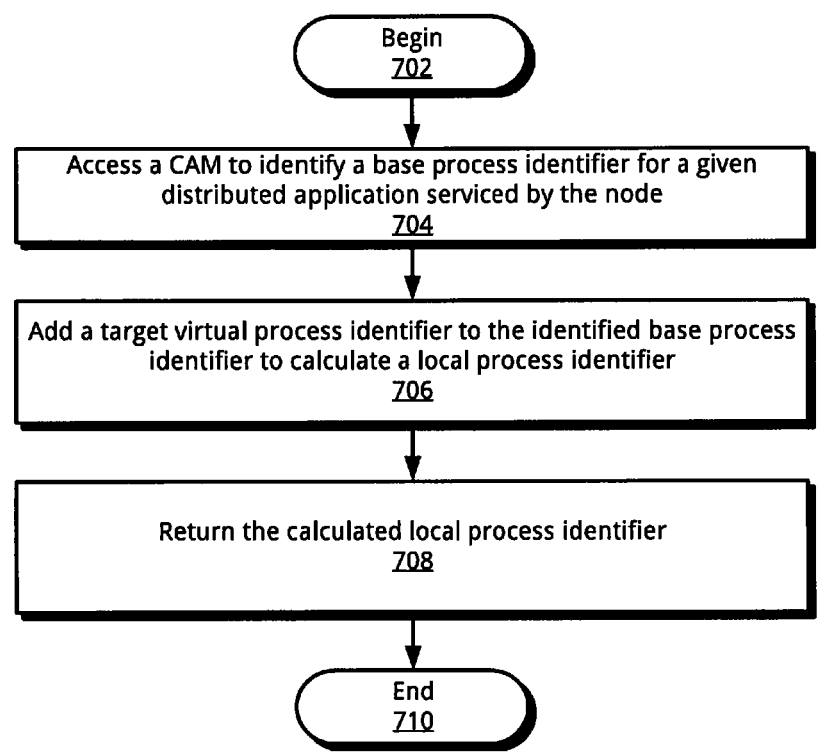
FIGS. 7A-7C collectively show another example process for performing target-side translation for use in the example method of FIG. 5, in accordance with an embodiment of the present disclosure.

Now referring to FIG. 7A, another example target-side translation process 508B is shown in accordance with an embodiment of the present disclosure. The example target-side translation process 508B may be executed in hardware of the node, such as by the network interface circuit. However, other embodiments are also within the scope of this disclosure. For instance, the example target-side translation process 508B may be implemented in software or a combination of hardware and software. The example target-side translation process 508B includes acts of accessing a content addressable memory (CAM) device to identify a base process address for a given parallel application serviced by the node, adding a target virtual process identifier to identified base process address to calculate a local process identifier, and returning the calculated local process identifier. The method 508B begins in act 702.

In act 704, the node accesses a content address memory (CAM) device to identify a base process address for a given parallel application. Each parallel application implemented across the multi-node network 100 may be uniquely identified by a particular job tag or identifier. Stated differently, a node may service one or more parallel applications by executing processes related to those parallel applications. To this end, the processes executed by each node may be associated across nodes based on the job tag. Each received inter-process communication, such as the inter-process communication received in act 504 of method 500, may identify the particular job associated with the inter-process communication. Thus the node may include a CAM device that is populated with job tags that correspond to the parallel applications serviced by the node. For each of the job tag, the CAM may include a corresponding index into a table that provides a contiguous address space for each job. In a general sense, the job identified within an inter-process communication provides a context that may be utilized during the target-side translation process.

Figure 7B:
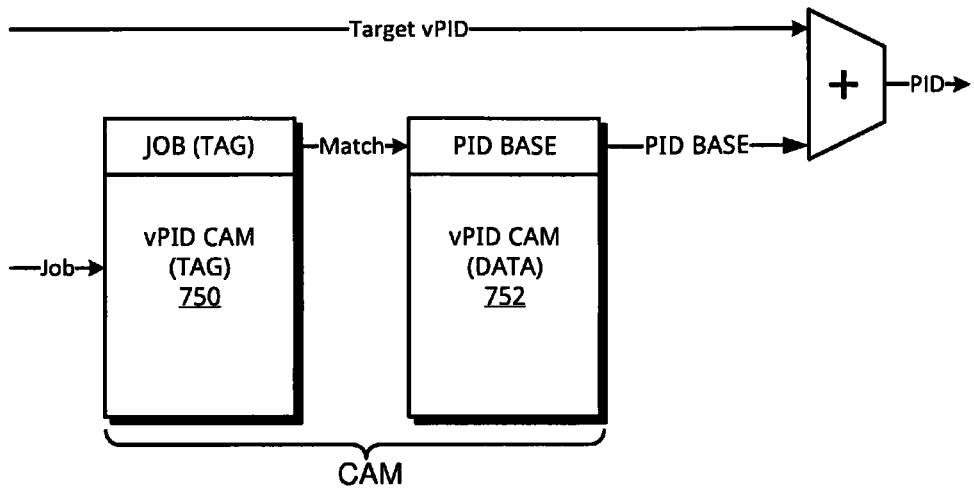
Figure 7C:
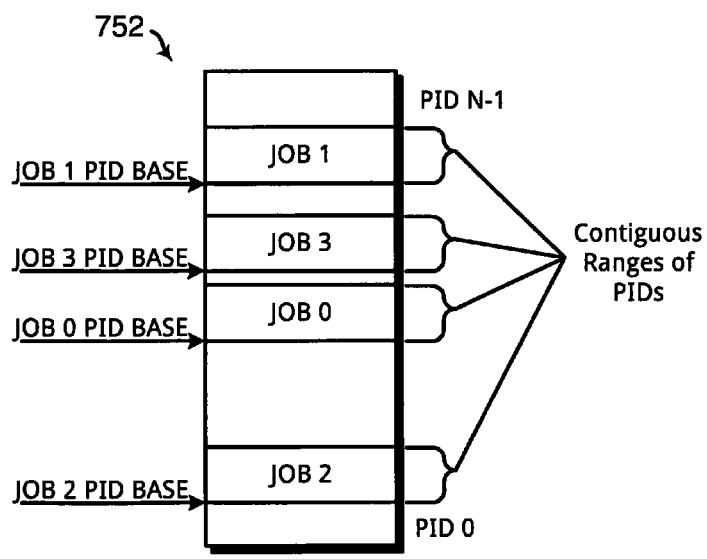

For example, as shown in FIG. 7B, a job associated with an inter-process request is matched to an entry in the job table 750. If a matching entry is found in the job table 750 (e.g., the job is serviced by processes of the node), an index value associated with the matched entry is used to access a process identifier (PID) base table 752. As shown in FIG. 7C, the PID base table 752 is partitioned by job, with each job having a range of contiguous identifiers starting from a base address. Thus the node may utilize the index value to identify a particular PID base address for the job using the PID base table 752. Once a PID base address for the job is identified, the target virtual process identifier received with the inter-process communication may be added to the PID base address to calculate a local process identifier.

Returning to FIG. 7A, and in act 708, the node returns the calculated local process identifier. For example, the method 500 may use the identified local process in act 510 to execute a particular memory operation in accordance with a received inter-process communication. The method 508B ends in act 710.

Figure 8A:
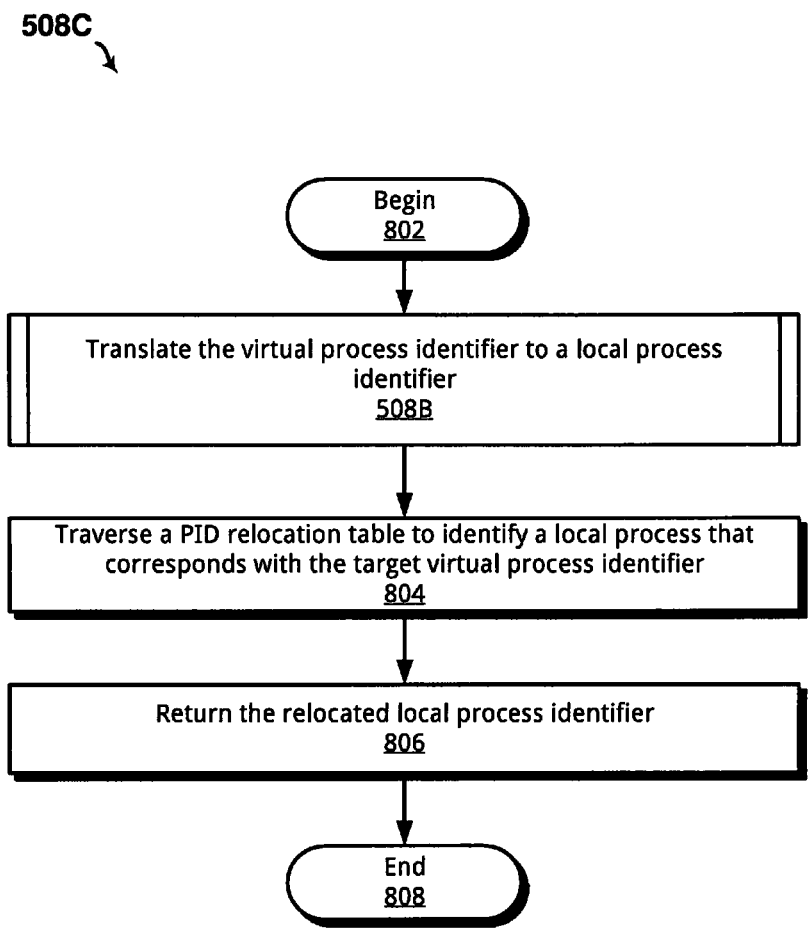
FIGS. 8A-8B collectively show yet another example process for performing target-side translation for use in the example method of FIG. 5, in accordance with an embodiment of the present disclosure.

Now referring to FIG. 8A, another example target-side translation process 508C is shown in accordance with an embodiment of the present disclosure. The example target-side translation process 508C may be executed in hardware of the node, such as by the network interface circuit. However, other embodiments are also within the scope of this disclosure. For instance, the example target-side translation process 508C may be implemented in software or a combination of hardware and software. The example target-side translation process 508C includes acts of translating the virtual process identifier to a local process identifier, traversing a PID relocation table to identify a local process that corresponds with the target virtual process identifier, and returning the relocated local process identifier. The process 508C begins in act 802.

In act 508B, the node translates the virtual process identifier to a local process identifier. As should be appreciated, act 508B comprises substantially the same acts of the example target-side translation process 508B of FIG. 7A, as discussed above, and for this reason will not be repeated for brevity.

In act 804, the node traverses a PID relocation table to identify a local process that corresponds with the target virtual process identifier calculated in act 508B. In some cases, the virtual process identifiers are not necessarily contiguous. For example, as shown previously in Table 1, the range of local process identifiers in each node is contiguous, but in some scenarios this may not be the case. Allocation and de-allocation of resource pools assigned to parallel applications may leave so-called "holes" such that subsequent allocations are provided a non-contiguous range of process identifiers. One such example of a non-contiguous process allocation for a node A is shown below in Table 4.

TABLE 4

Example Non-Contiguous Process Allocation

| Job Identifier | Local Process Identifiers For Node A |
|---|---|
| 0 | 0 |
| 0 | 1 |
| 0 | 2 |
| 5 | 6 |
| 5 | 10 |
| 5 | 12 |
| 99 | 7 |
| 99 | 11 |
| 32001 | 80 |
| 32001 | 82 |

Figure 8B:
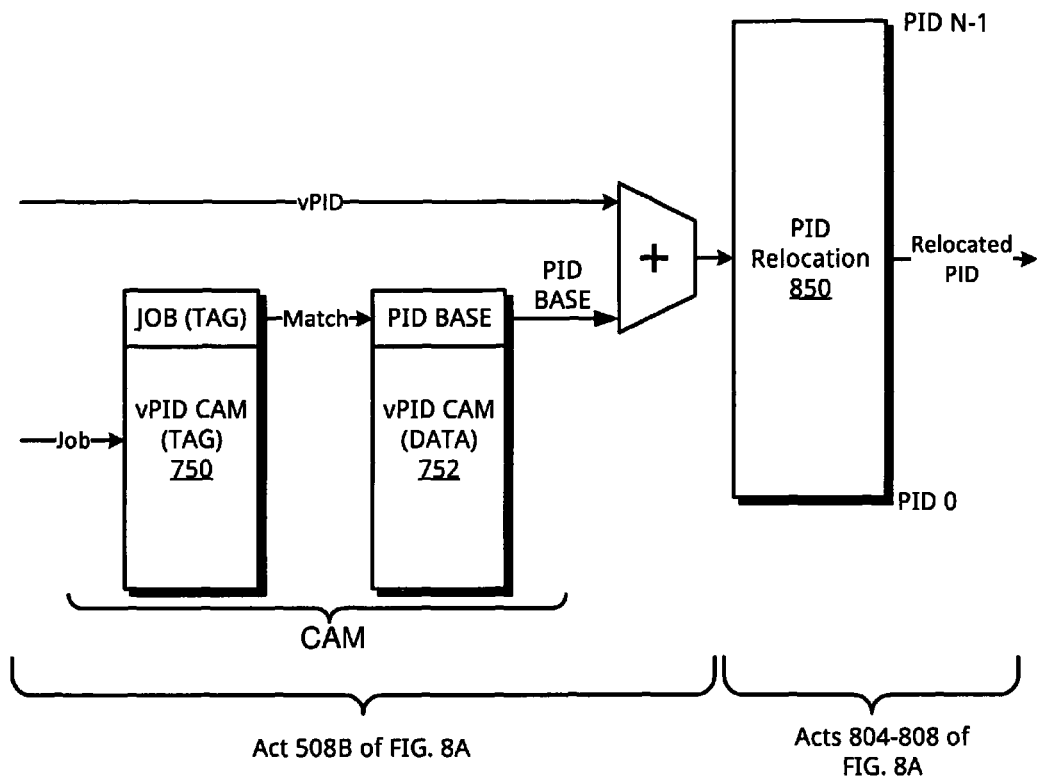

Thus the node may perform a so-called "full" relocation using the process identifier calculated in act 508B. For example, as shown in FIG. 8B the local process identifier derived in act 508B may be used to index a PID relocation table 850. Each entry in the PID relocation table 850 may include a local process identifier and a relocated PID. The relocated PID may then correspond to the actual local process that an inter-process communication seeks to perform a get/set on, for example. Thus the PID relocation table 850 allows a node to identify a particular local process without each job necessarily having a contiguous range of associated/assigned process identifiers.

Returning to FIG. 8A, and in act 806, the node returns the relocated local process identifier. For example, the method 500 may use relocated local process identifier in act 510 to execute a particular memory operation in accordance with a received inter-process communication. The method 508B ends in act 808.

Example System

FIG. 9 illustrates a computing system 900 configured to perform various processes disclosed herein. For example, system 900 may be incorporated into a personal computer (PC), laptop computer, wearable computing device, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920, so as to supplement navigational gesturing by the user. Each of these example components is described in more detail below.

In some embodiments, platform 902 may comprise any combination of a chipset 905, processor 910, memory 912, storage 914, graphics subsystem 915, camera 919, motion sensors 921, applications 916 and/or radio 918 or wireless transceiver circuit. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 910 may comprise dual-core processor(s), dual-core mobile processor(s), and so forth. Memory 912 may be implemented, for instance, as a volatile memory device such as, but not limited to, a Random Access Memory (RAM), Dynamic Random Access Memory (DRAM), or Static RAM (SRAM). Storage 914 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 914 may comprise technology to increase the storage performance enhanced protection for valuable digital media when multiple hard drives are included, for example.

Graphics subsystem 915 may perform processing of images such as still or video for display, and in some embodiments is configured to synthesize face images, as variously described herein. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some embodiments, content services device(s) 930 may be hosted by any national, international and/or independent service and thus accessible to platform 902 via the Internet or other network, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920. In some embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, graphics, text, medical and gaming content, and so forth.

Content services device(s) 930 receives content such as cable television programming including media information, digital information, and/or other content. Examples of content providers may include any cable or satellite television or radio or Internet content providers. The provided examples are not meant to limit the present disclosure. In some embodiments, platform 902 may receive control signals from navigation controller 950 having one or more navigation features. The navigation features of controller 950 may be used to interact with user interface 922, for example. In some embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In some embodiments, controller 950 may not be a separate component but integrated into platform 902 and/or display 920. Embodiments, however, are not limited to the elements or in the context shown or described herein, as will be appreciated.

In some embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chipset 905 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 9.

As described above, system 900 may be embodied in varying physical styles or form factors. FIG. 9 illustrates embodiments of a small form factor device 900 in which system 900 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchpad display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 discloses a method for performing inter-process communication between nodes of a multi-node system, the method comprising receiving, by circuitry, a packet from a remote node including a target virtual process identifier and at least one memory operation, translating, by the circuitry, the virtual process identifier into a local process identifier that corresponds with a local process, and causing, by the circuitry, the at least one memory operation to be performed against a region of memory associated with the local process.

Example 2 includes the subject matter of Example 1, wherein the circuitry comprises a network interface circuit.

Example 3 includes the subject matter of any one of Examples 1-2, wherein causing the at least one memory operation to be performed against the region of memory associated with the local process further includes the circuitry performing direct memory access (DMA) on a memory device.

Example 4 includes the subject matter of any one of Examples 1-3, wherein translating the virtual process identifier into the local process identifier that corresponds with the local process further includes the circuitry traversing a map to identify a local process that corresponds with the target virtual process identifier.

Example 5 includes the subject matter of any one of Examples 1-4, wherein the packet further includes a job tag, the job tag being associated with one or more local processes of a node.

Example 6 includes the subject matter of Example 5, wherein translating the virtual process identifier into the local process identifier that corresponds with the local process further includes accessing a content addressable memory (CAM) device to determine a base process address based on the job tag, and calculating the local process identifier by summing the base process address and the target virtual process identifier.

Example 7 includes the subject matter of Example 5, wherein translating the virtual process identifier into the local process identifier that corresponds with the local process further includes accessing a content addressable memory (CAM) device to determine a base process address based on the job tag, calculating a process identifier by summing the base process address and the target virtual process identifier, and accessing a process identifier relocation table to locate a local process identifier associated with the calculated process identifier.

Example 8 includes the subject matter of any one of Examples 1-7, wherein the virtual process identifier is based on an algorithmic mapping that maps a plurality of physical processes across N number of nodes.

Example 9 discloses a system, the system comprising a first node device comprising a memory, a controller coupled to the memory and configured to execute at least one local process, the at least one local process being associated with a region of the memory and a local process identifier, circuitry communicatively coupled to the controller and configured to be communicatively coupled to a multi-node network, the circuitry being configured to receive a packet from a remote node via the multi-node network, the packet including a virtual process identifier and at least one memory operation, identify a target local process at least in part by translating the virtual process identifier into a local process identifier that corresponds with the target local process, and cause the at least one memory operation to be performed against a region of memory associated with the target local process.

Example 10 includes the subject matter of Example 9, wherein the circuitry comprises a network interface circuit.

Example 11 includes the subject matter of any one of Examples 9-10, wherein causing the at least one memory operation to be performed against the region of memory associated with the target local process further includes the circuitry performing direct memory access (DMA) on the memory.

Example 12 includes the subject matter of any one of Examples 9-11, wherein translating the virtual process identifier into the local process identifier that corresponds with the local process further includes the circuitry traversing a map to identify a local process that corresponds with the virtual process identifier.

Example 13 includes the subject matter of Example 9, wherein the packet further includes a job tag, the job tag being associated with one or more local processes of the first node device.

Example 14 includes the subject matter of Example 13, wherein the first node device further comprises a content addressable memory (CAM) device.

Example 15 includes the subject matter of Example 14, wherein the circuitry is further configured to access the CAM device to determine a base process address based on the job tag, and identify the target local process by summing the base process address and the virtual process identifier.

Example 16 includes the subject matter of Example 14, wherein the circuitry is further configured to access the CAM device to determine a base process address based on the job tag, and calculate a process identifier by summing the base process address and the virtual process identifier, and identify the target local process by accessing a process identifier relocation table in the memory to locate the local process identifier associated with the calculated process identifier.

Example 17 includes the subject matter of any one of Examples 9-16, wherein the virtual process identifier is based on an algorithmic mapping that maps a plurality of physical processes across N number of nodes.

Example 18 includes the subject matter of any one of Examples 9-17, wherein the multi-node network includes a plurality of node devices, and wherein the multi-node network includes hardware fabric in an all-to-all configuration such that each node has a path to all other nodes.

Example 19 includes the subject matter of Example 9, further comprising a second node device, comprising a memory, a network interface circuit communicatively coupled to a multi-node network, circuitry coupled to the memory and configured to receive a request to perform inter-process communication, the request identifying a logical process identifier, calculate a target physical node identifier and a target local process identifier based on an algorithmic mapping, and cause a packet to be routed to the target physical node via the multi-node network.

Example 20 includes the subject matter of Example 19, wherein the algorithmic mapping comprises a blocked or a folded algorithmic mapping.

Example 21 discloses a non-transitory computer-readable medium having a plurality of instructions encoded thereon that when executed by at least one processor cause a process to be carried out, the process comprising receiving a packet from a remote node via a multi-node network, the packet including a target virtual process identifier and at least one memory operation, translating the virtual process identifier into a local process identifier that corresponds with a local process, and causing the at least one memory operation to be performed against a region of memory associated with the local process.

Example 22 includes the subject matter of Example 21, wherein the memory operation is a get or set operation.

Example 23 includes the subject matter of any one of Examples 21-22, wherein causing the at least one memory operation to be performed against a region of memory associated with the local process further includes causing circuitry to perform direct memory access (DMA) on a memory device.

Example 24 includes the subject matter of any one of Examples 21-23, wherein translating the virtual process identifier into the local process identifier that corresponds with the local process further includes traversing a map to identify a local process that corresponds with the target virtual process identifier.

Example 25 includes the subject matter of Example 21, wherein the packet further includes a job tag, the job tag being associated with one or more local processes of a node.

Example 26 includes the subject matter of Example 25, wherein translating the virtual process identifier into the local process identifier that corresponds with the local process further includes causing circuitry to access a content addressable memory (CAM) device to determine a base process address based on the job tag, and calculating the local process identifier by summing the base process address and the target virtual process identifier.

Example 27 includes the subject matter of Example 25, wherein translating the virtual process identifier into the local process identifier that corresponds with the local process further includes causing circuitry to access a content addressable memory (CAM) device to determine a base process address based on the job tag, calculating a local process identifier by summing the base process address and the target virtual process identifier, and accessing a process identifier relocation table to locate a local process identifier associated with the process identifier.

Example 28 discloses a system comprising a memory, means for receiving a packet from a remote node via a multi-node network, the packet including a virtual process identifier and at least one memory operation, means for identifying a target local process at least in part by translating the virtual process identifier into a local process identifier that corresponds with the target local process, and means for causing the at least one memory operation to be performed against a region of memory associated with the target local process.

Example 29 includes the subject matter of Example 28, further comprising means for traversing a map to identify a local process that corresponds with the virtual process identifier.

Example 30 includes the subject matter of any one of Examples 28-29, wherein the packet further includes a job tag, the job tag being associated with one or more local processes.

Example 31 includes the subject matter of Example 30, further comprising means for determining a base process address based on the job tag, and means for identifying the target local process by summing the base process address and the virtual process identifier.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for performing inter-process communication between nodes of a multi-node system, the method comprising:
   receiving, by circuitry, a packet from a remote node including a target virtual process identifier and at least one memory operation;
   translating, by the circuitry, the virtual process identifier into a local process identifier that corresponds with a local process; and
   causing, by the circuitry, the at least one memory operation to be performed against a region of memory associated with the local process.

2. The method of claim 1, wherein the circuitry comprises a network interface circuit.

3. The method of claim 1, wherein causing the at least one memory operation to be performed against the region of memory associated with the local process further includes the circuitry performing direct memory access (DMA) on a memory device.

4. The method of claim 1, wherein translating the virtual process identifier into the local process identifier that corresponds with the local process further includes the circuitry traversing a map to identify a local process that corresponds with the target virtual process identifier.

5. The method of claim 1, wherein the packet further includes a job tag, the job tag being associated with one or more local processes of a node.

6. The method of claim 5, wherein translating the virtual process identifier into the local process identifier that corresponds with the local process further includes:
   accessing a content addressable memory (CAM) device to determine a base process address based on the job tag; and
   calculating the local process identifier by summing the base process address and the target virtual process identifier.

7. The method of claim 5, wherein translating the virtual process identifier into the local process identifier that corresponds with the local process further includes:
   accessing a content addressable memory (CAM) device to determine a base process address based on the job tag;
   calculating a process identifier by summing the base process address and the target virtual process identifier; and
   accessing a process identifier relocation table to locate a local process identifier associated with the calculated process identifier.

8. The method of claim 1, wherein the virtual process identifier is based on an algorithmic mapping that maps a plurality of physical processes across N number of nodes.

9. A system comprising:
   a first node device comprising:
      a memory;
      a controller coupled to the memory and configured to execute at least one local process, the at least one local process being associated with a region of the memory and a local process identifier;
      circuitry communicatively coupled to the controller and configured to be communicatively coupled to a multi-node network, the circuitry being configured to:
         receive a packet from a remote node via the multi-node network, the packet including a virtual process identifier and at least one memory operation;
         identify a target local process at least in part by translating the virtual process identifier into a local process identifier that corresponds with the target local process; and
         cause the at least one memory operation to be performed against a region of memory associated with the target local process.

10. The system of claim 9, wherein the circuitry comprises a network interface circuit.

11. The system of claim 9, wherein causing the at least one memory operation to be performed against the region of memory associated with the target local process further includes the circuitry performing direct memory access (DMA) on the memory.

12. The system of claim 9, wherein translating the virtual process identifier into the local process identifier that corresponds with the local process further includes the circuitry traversing a map to identify a local process that corresponds with the virtual process identifier.

13. The system of claim 9, wherein the packet further includes a job tag, the job tag being associated with one or more local processes of the first node device.

14. The system of claim 13, wherein the first node device further comprises a content addressable memory (CAM) device.

15. The system of claim 14, wherein the circuitry is further configured to:
   access the CAM device to determine a base process address based on the job tag; and
   identify the target local process by summing the base process address and the virtual process identifier.

16. The system of claim 14, wherein the circuitry is further configured to:
   access the CAM device to determine a base process address based on the job tag; and
   calculate a process identifier by summing the base process address and the virtual process identifier; and
   identify the target local process by accessing a process identifier relocation table in the memory to locate the local process identifier associated with the calculated process identifier.

17. A non-transitory computer-readable medium having a plurality of instructions encoded thereon that when executed by at least one processor cause a process to be carried out, the process comprising:
   receiving a packet from a remote node via a multi-node network, the packet including a target virtual process identifier and at least one memory operation;
   translating the virtual process identifier into a local process identifier that corresponds with a local process; and
   causing the at least one memory operation to be performed against a region of memory associated with the local process.

18. The computer-readable medium of claim 17, wherein the memory operation is a get or set operation.

19. The computer-readable medium of claim 17, wherein causing the at least one memory operation to be performed against a region of memory associated with the local process further includes causing circuitry to perform direct memory access (DMA) on a memory device.

20. The computer-readable medium of claim 17, wherein translating the virtual process identifier into the local process identifier that corresponds with the local process further includes traversing a map to identify a local process that corresponds with the target virtual process identifier.

21. A system comprising:
   a memory;
   means for receiving a packet from a remote node via a multi-node network, the packet including a virtual process identifier and at least one memory operation;
   means for identifying a target local process at least in part by translating the virtual process identifier into a local process identifier that corresponds with the target local process; and
   means for causing the at least one memory operation to be performed against a region of memory associated with the target local process.

22. The system of claim 21, further comprising means for traversing a map to identify a local process that corresponds with the virtual process identifier.

23. The system of claim 22, wherein the packet further includes a job tag, the job tag being associated with one or more local processes.

24. The system of claim 23, further comprising:
   means for determining a base process address based on the job tag; and
   means for identifying the target local process by summing the base process address and the virtual process identifier.

* * * * *

UNITED STATES PATENT AND TRADEMARK OFFICE
CERTIFICATE OF CORRECTION

PATENT NO. : 9,852,107 B2  Page 1 of 1
APPLICATION NO. : 14/998255
DATED : December 26, 2017
INVENTOR(S) : Underwood et al.

It is certified that error appears in the above-identified patent and that said Letters Patent is hereby corrected as shown below:

On the Title Page

At (72) Inventors: Column 1 Line 2, delete "Charles F. Giefer" and insert --Charles A. Giefer--.

Signed and Sealed this
Eighth Day of May, 2018

Andrei Iancu
*Director of the United States Patent and Trademark Office*